(12) United States Patent
Kim et al.

(10) Patent No.: US 9,104,414 B2
(45) Date of Patent: Aug. 11, 2015

(54) MULTIMEDIA PROCESSING SYSTEM AND METHOD OF OPERATING THE SAME

(71) Applicant: Samsung Electronics Co., Ltd., Suwon-Si, Gyeonggi-Do (KR)

(72) Inventors: Sun Kyu Kim, Yongin-si (KR); Shin Kyu Park, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 95 days.

(21) Appl. No.: 13/962,372

(22) Filed: Aug. 8, 2013

(65) Prior Publication Data

US 2014/0047253 A1 Feb. 13, 2014

(30) Foreign Application Priority Data

Aug. 9, 2012 (KR) ......................... 10-2012-0087469

(51) Int. Cl.
| | |
|---|---|
| G06F 1/32 | (2006.01) |
| G06F 3/06 | (2006.01) |
| G06F 17/30 | (2006.01) |
| G01L 19/00 | (2006.01) |
| H04N 19/00 | (2014.01) |
| H04N 21/44 | (2011.01) |
| G10L 19/00 | (2013.01) |
| H04L 29/06 | (2006.01) |
| H04N 21/414 | (2011.01) |
| H04N 21/443 | (2011.01) |

(52) U.S. Cl.
CPC ............ *G06F 1/3228* (2013.01); *G06F 1/3287* (2013.01); *G06F 3/0601* (2013.01); *G06F 17/30017* (2013.01); *G10L 19/00* (2013.01); *H04L 65/607* (2013.01); *H04N 19/00* (2013.01); *H04N 21/41407* (2013.01); *H04N 21/44004* (2013.01); *H04N 21/4436* (2013.01)

(58) Field of Classification Search
CPC ..... G06F 1/3228; G06F 1/3287; G06F 3/0601; G06F 17/30017; G10L 19/00; H04N 19/00; H04N 21/4436
USPC ......................................................... 713/323
See application file for complete search history.

(56) References Cited

U.S. PATENT DOCUMENTS

| | | | |
|---|---|---|---|
| 6,741,961 B2 | 5/2004 | Lim | |
| 7,818,443 B2 | 10/2010 | Du et al. | |
| 8,041,848 B2 * | 10/2011 | Conroy et al. | 710/22 |

(Continued)

FOREIGN PATENT DOCUMENTS

| | | | |
|---|---|---|---|
| EP | 01310697 A1 | 5/2003 | |
| JP | 2005190332 A | 7/2005 | |
| JP | 2008180967 A | 8/2008 | |

(Continued)

*Primary Examiner* — Stefan Stoynov
(74) *Attorney, Agent, or Firm* — Harness, Dickey & Pierce, P.L.C.

(57) ABSTRACT

The multimedia processing system includes a plurality of first units including a CPU and a top domain; a storage domain configured to store a plurality of multimedia data; a multimedia codec domain configured to decode segments of target multimedia data received from the storage domain and to output decoded segments according to control of the CPU or the top domain; a system bus configured to connect the plurality of first units, the storage domain, and the multimedia codec domain with one another; and an alive domain configured to control power supply to the plurality of first units, the storage domain, the multimedia codec domain, and the system bus and to receive a signal from a user.

18 Claims, 7 Drawing Sheets

(56) References Cited

U.S. PATENT DOCUMENTS

| | | | |
|---|---|---|---|
| 8,738,824 B1 * | 5/2014 | Gu et al. | 710/52 |
| 8,914,657 B2 * | 12/2014 | Lin | 713/322 |
| 2006/0200573 A1 * | 9/2006 | Lin | 709/231 |
| 2008/0188968 A1 | 8/2008 | Kiyozaki | |
| 2009/0003115 A1 * | 1/2009 | Lindahl et al. | 365/227 |
| 2009/0070119 A1 | 3/2009 | Yoo et al. | |
| 2011/0246206 A1 | 10/2011 | Kim et al. | |
| 2012/0075409 A1 | 3/2012 | Hsieh | |

FOREIGN PATENT DOCUMENTS

| | | |
|---|---|---|
| JP | 2009104271 A | 5/2009 |
| JP | 2010091154 A | 4/2010 |
| KR | 20100053940 A | 5/2010 |
| KR | 20110110434 A | 7/2011 |
| KR | 1073406 | 10/2011 |

* cited by examiner

MULTIMEDIA PROCESSING SYSTEM AND METHOD OF OPERATING THE SAME

CROSS-REFERENCE TO RELATED APPLICATIONS

This application claims priority under 35 U.S.C. §119(a) from Korean Patent Application No. 10-2012-0087469 filed on Aug. 9, 2012, the disclosure of which is hereby incorporated by reference in its entirety.

BACKGROUND

1. Field

Embodiments of the inventive concepts relate to a multimedia processing system and a method of operating the same, and more particularly, to a multimedia processing system for processing a multimedia file in an electronic apparatus and a method of operating the same.

2. Related Art

Multimedia data is compressed by an encoding device and is then transmitted to a decoding device or stored in a storage device together with a spatial information signal. A system, which effectively recovers compressed audio data such as MP3, AAC, and WMA in multimedia data and compressed video data such as MPEG in the multimedia data into an analog format and a digital pulse code modulation format, consumes a lot of processing power to recover the compressed multimedia data. The processing power is an important issue since it affects battery consumption in portable devices.

SUMMARY

According to some embodiments of the inventive concepts, a multimedia processing system includes a plurality of first units including a central processing unit (CPU) and a top domain; a storage domain configured to store a plurality of multimedia data; a multimedia codec domain configured to decode segments of target multimedia data received from the storage domain and to output decoded segments according to control of the CPU; a system bus configured to connect the plurality of first units, the storage domain, and the multimedia codec domain with one another; and an alive domain configured to control power supply to the plurality of first units, the storage domain, the multimedia codec domain, and the system bus, the alive domain including a user interface configured to receive an input signal from a user, wherein the multimedia processing system is configured such that while the multimedia codec domain is performing a decoding operation, the plurality of first units and the system bus are switched to a low-power mode.

The multimedia processing system may be configured such that the multimedia codec domain is switched to the low-power mode when the multimedia codec domain completes the decoding operation.

The multimedia codec domain may be configured such that when the plurality of first units are in the low-power mode, the multimedia codec domain activates the system bus independently from the plurality of first units to access the storage domain.

The top domain may include a main direct memory access (DMA) controller configured to directly access the target multimedia data stored in the storage domain and load the segments of the target multimedia data to the multimedia codec domain according to the control of the CPU based on the input signal.

The storage domain may include a storage unit configured to store the plurality of multimedia data; a storage controller configured to control the storage unit and an access to the storage unit; a system memory including a stream buffer configured to store the target multimedia data; and a system memory controller configured to control the system memory and an access to the system memory. The multimedia processing system may be configured such that segments of the target multimedia data from the storage unit through the storage controller and loaded to the stream buffer through the system memory controller.

The multimedia codec domain may include a control module configured to generate an operation control command for the multimedia codec domain according based on control signals from the CPU and to send a request to the plurality of first units; a first buffer configured to store the segments of the target multimedia data received through the system memory controller; a second buffer configured to store the decoded segments of the target multimedia data; a multimedia codec processor configured to decode the segments in the first buffer and send the decoded segments to the second buffer; a sub-direct memory access (DMA) controller configured to access the stream buffer or the first buffer; and a local bus configured to connect the control module, the first buffer, the second buffer, the multimedia codec processor, the sub-DMA controller, and the system bus with one another.

The control module may be configured such that when the stream buffer is empty, the control module switches the plurality of first units and the system bus to a wake-up mode and generates a request to transfer other segments of the target multimedia data from the storage unit.

The CPU may be configured to initialize the multimedia codec domain, control the multimedia codec domain to perform the decoding operation when the input signal is a play start request, and control the multimedia codec domain to exit the decoding operation when a request of the multimedia codec domain or the input signal is a play end request.

The control module may be configured to send a request to exit the decoding operation to the CPU when one of the segments in the first buffer is a last segment of the target multimedia data or when the input signal is a play end request.

At least one of the first buffer and the second buffer may operate as a dual buffer.

According to some embodiments of the inventive concepts, a method of operating a multimedia processing system including a multimedia codec domain, a central processing unit (CPU), a top domain, a storage domain, and a system bus, may include receiving, at the CPU, an input signal corresponding to a play start request for target multimedia data; accessing, at the top domain, the storage domain; transmitting, from the top domain, segments of the target multimedia data to the multimedia codec domain in response to control signals from the CPU; decoding, at the multimedia codec domain, the segments and outputting decoded segments; and repeating the receiving, accessing and decoding operations until the multimedia codec domain decodes a last segment of the target multimedia data or a play end request is received, wherein the CPU, the top domain, and the system bus are switched to a low-power mode while the multimedia codec domain is decoding the segments.

The accessing may include activating only the system bus; and directly accessing the storage domain while the multimedia codec domain is decoding the segments.

The method may further include switching the multimedia codec domain to the low-power mode when decoding of the last segment of the target multimedia data is completed or when the multimedia processing system receives a play end request.

The multimedia codec domain may include a first buffer configured to store the segments of the target multimedia data received from the storage domain, and a second buffer configured to store and output the decoded segments, and the accessing may include activating the system bus; directly accessing other segments of the target multimedia data in the storage domain when the first buffer empties; transmitting the other segments to the first buffer; and switching the system bus to the low-power mode.

The method may further include initializing, at the top domain, the multimedia codec domain according to the control of the CPU.

According to some embodiments of the inventive concepts, a multimedia processing system may include a central processing unit (CPU); a storage domain configured to store multimedia data; a multimedia codec domain configured to decode segments of the multimedia data received from the storage domain and to output decoded segments in response to control signals from the CPU; a system bus configured to connect the CPU, the storage domain, and the multimedia codec domain with one another; and wherein the multimedia processing system is configured such that when the multimedia codec domain performs a decoding operation, the multimedia processing system switches the CPU and the system bus from a first power mode to a second power mode lower than the first power mode, and when the multimedia codec domain accesses the multimedia data stored in the storage domain during the decoding operation, the multimedia processing system switches the system bus from the second power mode to a power mode higher than the second power mode without switching the CPU from the second power mode to a higher power mode, and the multimedia codec domain is configured to access the multimedia data stored in the storage domain via the system bus.

The multimedia processing system may include a plurality of first units, the CPU being a first one the plurality of first units, a top domain being a second one of the plurality of first units, the system bus being configured to connect the plurality of first units, the storage domain, and the multimedia codec domain with one another.

The multimedia processing system may further include an alive domain including a user interface configured to receive an input signal from a user, the alive domain configured to control power supply to the plurality of first units, the storage domain, the multimedia codec domain, and the system bus.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
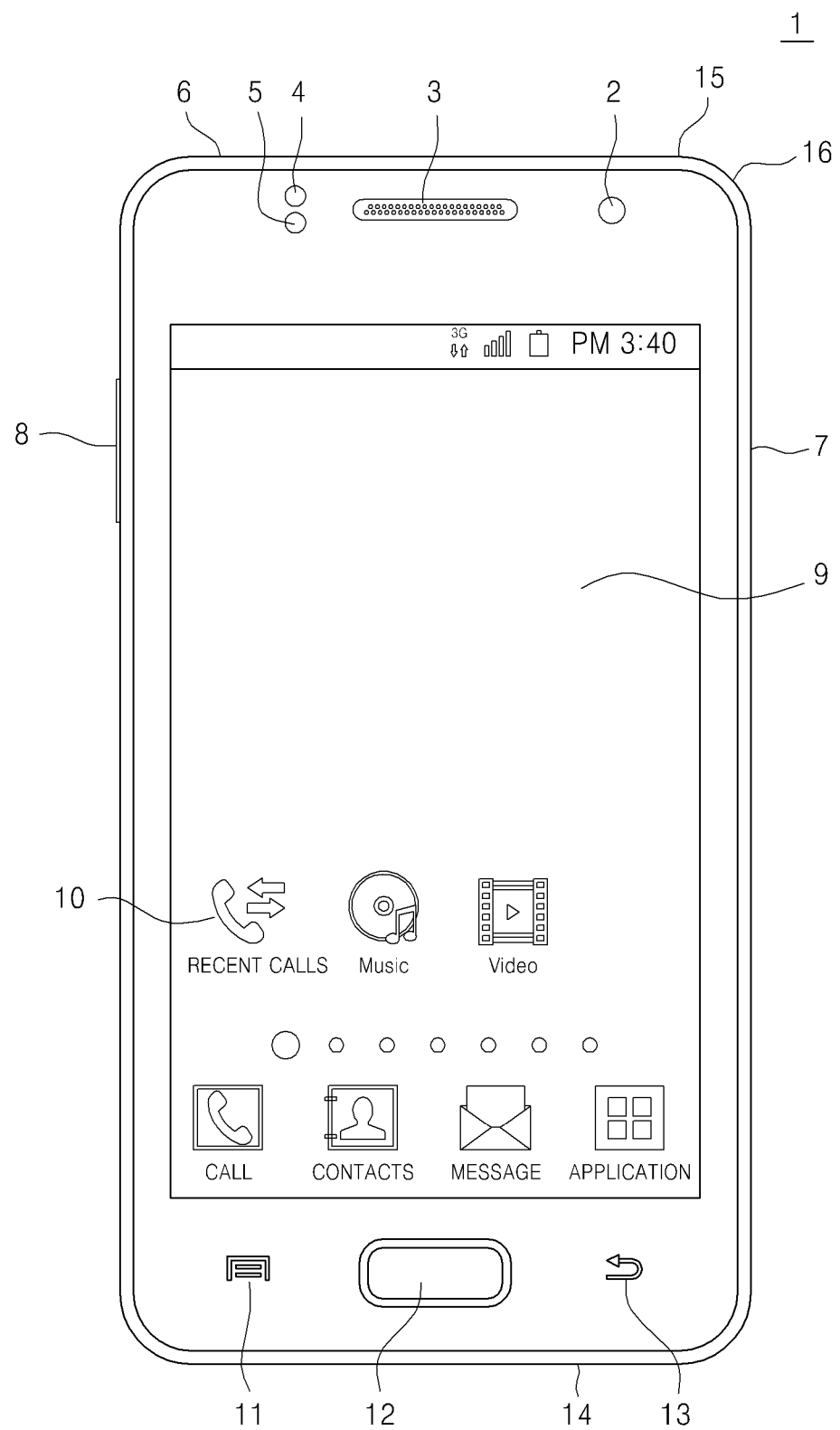
FIG. 1 is a front view of a portable electronic apparatus including a multimedia processing system according to some embodiments of the inventive concepts.

Detailed example embodiments are disclosed herein. However, specific structural and functional details disclosed herein are merely representative for purposes of describing example embodiments. Example embodiments may, however, be embodied in many alternate foul's and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a front view of an electronic apparatus 1 including a multimedia processing system according to some embodiments of the inventive concepts. The electronic apparatus 1 may be a device, such as an electronic dictionary, a mobile phone, an MP3 player, or a tablet personal computer (PC), which can reproduce multimedia data. The electronic apparatus 1 may be a device that is operated by a user's direct input or that communicates through a data network like the Internet, or other network systems. FIG. 1 illustrates a mobile phone with a touch screen as an example of the electronic apparatus 1.

Referring to FIG. 1, in accordance with at least one example embodiment, the electronic apparatus 1 includes a front camera 2, a speaker 3, a proximity sensor 4, an ambient light sensor 5, a universal serial bus (USB) interface 6, a power button 7, a volume control button 8, a display and touch screen 9, an icon 10, a menu button 11, a home button 12, a cancel button 13, a microphone 14, an audio output interface 15, and an antenna 16.

The front camera 2 is on the side of the touch screen 9 and is used for video calls or as a camera. The speaker 3 outputs audio data when a user touches the icon 10 on the touch screen 9, inputs a voice signal to reproduce multimedia data, or makes a conversation with another person through a telephone network, or when an operation sound or a notification sound of the electronic apparatus 1 is reproduced. The proximity sensor 4 is a sensor that controls turning on or off of the display and touch screen 9 in order to reduce power consumption or prevent wrong operations due to unintentional touches when a user puts the electronic apparatus 1 close to an ear for a call. The ambient light sensor 5 controls the display and touch screen 9 and the front camera 2 according to the quantity of incident light from the surroundings of the electronic apparatus 1. The USB interface 6 is an input/output interface used for data communication between the electronic apparatus 1 and an external device and for power supply.

The power button 7 turns on or off the electronic apparatus 1 or the display and touch screen 9 only. The volume control button 8 controls the audio output of the speaker 3. The icon 10 may include a plurality of icons on the display and touch screen 9 according to various functions. For instance, a user may touch the icon 10 in order to play multimedia data.

The menu button 11 allows a user to view a menu including icons and a setting menu. The home button 12 shows a user a home screen on the display and touch screen 9 for multi-working while the electronic apparatus 1 is performing a certain operation. The cancel button 13 cancels a current operation which is being performed by the electronic apparatus 1 and returns the display and touch screen 9 to a previous screen.

The microphone 14 is an input/output interface for voice calls or voice input signals. The audio output interface 15, e.g., an earphone jack, is for audio output of multimedia data that is being reproduced. Although not shown, audio output and microphone input may be interfaced through a device such as Bluetooth®.

The antenna 16 is for receiving a digital media broadcasting service. The elements of the electronic apparatus 1 may be embodied by those skilled in the art in various ways within a feasible range.

Figure 2:
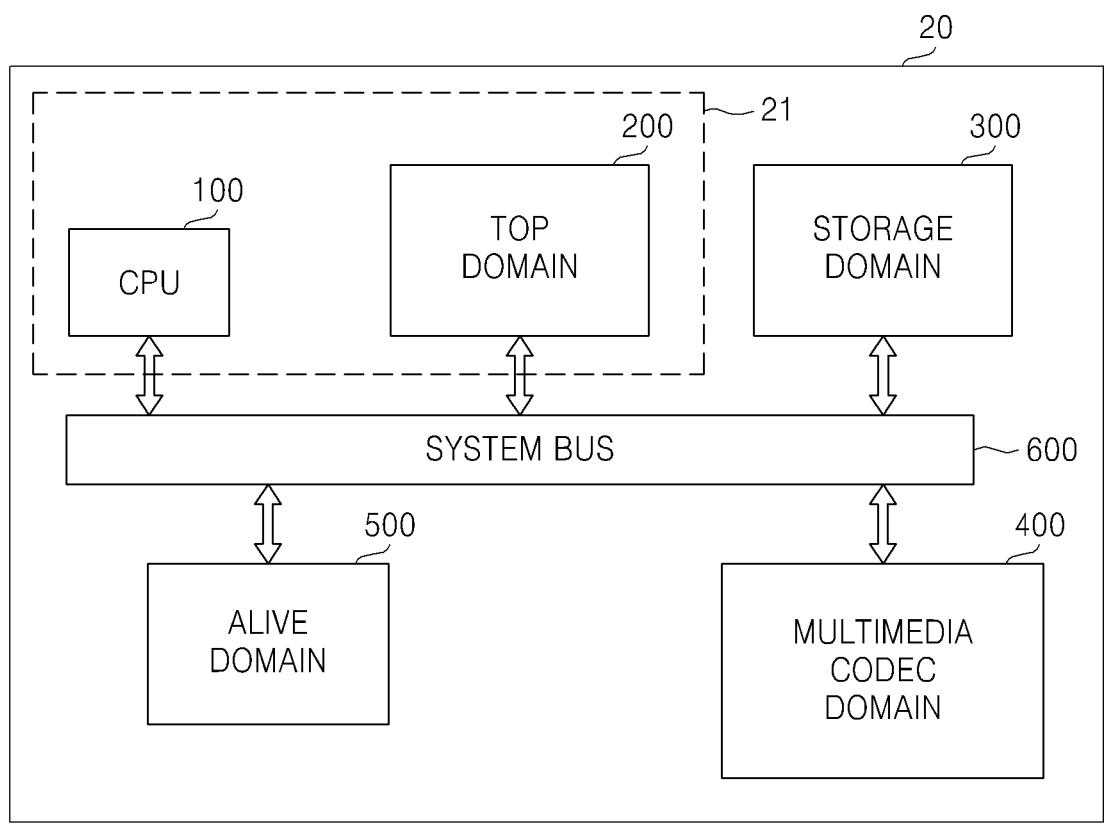
FIG. 2 is a schematic block diagram of a multimedia processing system according to some embodiments of the inventive concepts.

FIG. 2 is a schematic block diagram of a multimedia processing system 20 according to some embodiments of the inventive concepts. Referring to FIG. 2, the electronic apparatus 1 may include the multimedia processing system 20 for the reproduction of multimedia data. The multimedia processing system 20 includes a plurality of first units 21 including a central processing unit (CPU) 100 and a top domain 200, a storage domain 300, an alive domain 500, a multimedia codec domain 400, and a system bus 600.

Here, the term "domain" indicates a certain range of particular blocks having the same function. It may refer to hardware that can perform a particular function and operation in accordance with its name, a computer program code that can perform the particular function and operation, or an electronic recording medium, e.g., a processor, which is equipped with the computer program code. In other words, the domain may indicate a functional and/or structural combination of hardware for realizing the inventive concepts and/or software for driving the hardware.

The CPU 100 is a data processing device which may be, for example, a microprocessor. The CPU 100 manages the operations and functions of the electronic apparatus 1. The CPU 100 may control the top domain 200, the storage domain 300, and the multimedia codec domain 400. The CPU 100 may include a cache or a read-only memory (ROM) storing firmware or the like which, according to at least some example embodiments, allow the CPU 100 to operate completely internally.

The top domain 200 is a set of intellectual properties (IPs) with respect to a multimedia codec and a plurality of IPs except for the CPU 100. The top domain 200 may receive a play start request and control the transfer of multimedia data from the storage unit 300 to the multimedia codec domain 400. The top domain 200 may also control a clock signal, for example, adaptively gating a clock signal provided for each of the IPs or adaptively controlling the frequency of the clock signal according to the power mode of the electronic apparatus 1. The storage domain 300 may store multimedia data and transmit segments in the target multimedia data to the multimedia codec domain 400 in response to an access of the multimedia codec domain 400 or the top domain 200.

The multimedia codec domain 400 decodes the target multimedia data segments received from the storage domain 300 and outputs the decoded segments according to the control of, for example, the CPU 100 or the top domain 200. At this time, the decoded segments are output through a user interface (501 in FIG. 3), for example, an audio interface (such as the earphone jack 15 (FIG. 1), the speaker 3 (FIG. 1), or a Bluetooth interface).

The multimedia codec domain 400 may also perform a coding processing operation on segments of raw data input through the user interface 501 according to the control of the CPU 100. At this time, the raw data is converted into a multimedia data format and then stored in the storage domain 300.

The alive domain 500 may control power supply to each of the IPs such as the CPU 100, the top domain 200, the storage domain 300, the multimedia codec domain 400, and the system bus 600. The alive domain 500 may also receive an input signal from a user. The alive domain 500 is always active unless the power of the electronic apparatus 1 is turned off.

The system bus 600 connects the CPU 100, the top domain 200, the storage domain 300, and the multimedia codec domain 400 with one another for data communication. The system bus 600 may be a data bus conforming to the Advanced Microcontroller Bus Architecture (AMBA®). The power mode of the system bus 600 may be changed by the control of the CPU 100 or the multimedia codec domain 400.

In the electronic apparatus 1, the CPU 100 and the top domain 200 enter a low-power mode unless there is another request while the multimedia codec domain 400 is coding or decoding multimedia data. When the CPU 100 and the top domain 200 enter the low-power mode while the multimedia codec domain 400 is performing a decoding operation, the system bus 600 may also enter the low-power mode unless there is a request from the multimedia codec domain 400. Even while the CPU 100 and the top domain 200 are in the low-power mode, the multimedia codec domain 400 may activate only the system bus 600 and directly access the storage domain 300 in order to decode the remaining segments of the target multimedia data. The multimedia codec domain 400 may also enter the low-power mode when the coding/decoding operation is completed.

The CPU 100, the top domain 200, and the multimedia codec domain 400 may be implemented in separate chips, respectively, or at least two of them may be integrated into a single circuit. For instance, the CPU 100, the top domain 200, and the multimedia codec domain 400 may be implemented as separate integrated circuits, respectively, or at least two of them may be distributed in at least one integrated circuit.

Figure 3:
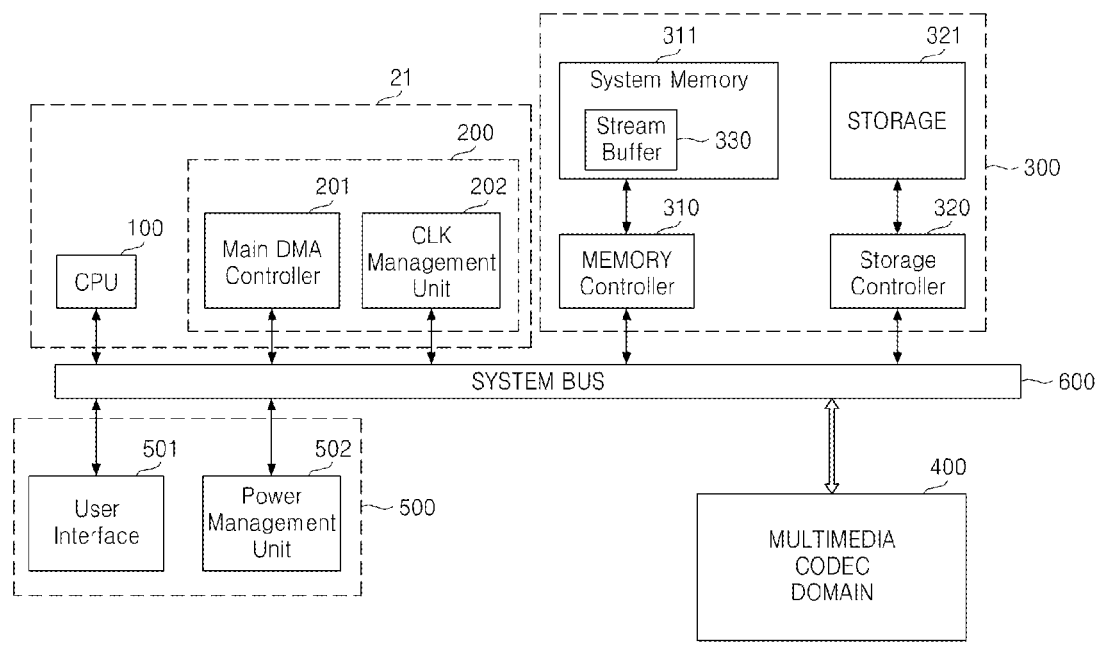
FIG. 3 is a detailed block diagram of a multimedia processing system according to some embodiments of the inventive concepts.

FIG. 3 is a detailed block diagram of the multimedia processing system 20 according to some embodiments of the inventive concepts. Referring to FIG. 3, the multimedia processing system 20 may include a plurality of the first units 21 including the CPU 100 and the top domain 200, the storage domain 300, the multimedia codec domain 400, and the system bus 600.

The CPU 100 may control the top domain 200 and the multimedia codec domain 400 according to a signal input by a user or an external input signal. The CPU 100 may initialize the multimedia codec domain 400 and controls the multimedia codec domain 400 to perform a coding or decoding operation. When receiving a play end request from the multimedia codec domain 400 or the user interface 501, the CPU 100 may control the top domain 200 and the multimedia codec domain 400 to terminate the coding or decoding operation.

The top domain 200 includes a main direct memory access (DMA) controller 201 and a clock management unit 202. The main DMA controller 201 may directly access target multimedia data stored in the storage domain 300 according to a first command and transmit segments of the target multimedia data to a stream buffer 330 through the system bus 600. The clock management unit 202 is provided with power and a clock signal from the alive domain 500 and controls a frequency of the clock signal or gates the clock signal so that an appropriate clock signal is applied to each of the IPs.

The top domain 200 includes only the main DMA controller 201 and the clock management unit 202 in the example illustrated in FIG. 3, but the inventive concepts are not restricted to the example illustrated in FIG. 3 and the top domain 200 may include other IPs in other embodiments. The storage domain 300 includes a storage unit 321, a storage controller 320, a system memory 311, and a system memory controller 310.

The storage unit 321 stores a plurality of multimedia data. The storage controller 320 controls the storage unit 321 in order to write data to or read data from the storage unit 321. The storage unit 321 may be accessed by the main DMA controller 201. The storage controller 320 may read target multimedia data from the storage unit 321 and transmit segments of the target multimedia data to the system memory 311 or may receive coded segment of input data from the multimedia codec domain 400 and write the segments to the storage unit 321. The storage unit 321 may be a non-volatile memory device such as flash memory, magnetic random access memory (MRAM), a resistive RAM (RRAM), phase-change RAM (PRAM), ROM, electrically erasable programmable ROM (EEPROM), or resistive memory.

The system memory 311 may be accessed at the request of the main DMA controller 201 or a sub-DMA controller 456, which will be discussed in greater detail below with reference to FIG. 4. The system memory 311 may include the stream buffer 330 that stores the segments of the target multimedia data received from the storage controller 320. The system memory controller 310 may access the system memory 311 and write data to or read data from the system memory 311 at the request of the top domain 200 or the multimedia codec domain 400.

The system memory 311 may be a volatile memory device such as dynamic RAM (DRAM), static RAM (SRAM), fast page mode (FPM) DRAM, window RAM (WRAM), extended data out (EDO) RAM, burst EDO (REDO) RAM, multibank DRAM (MDRAM), synchronous graphics RAM (SGRAM), synchronous DRAM (SDRAM), direct rambus DRAM (DRDRAM), double data rate (DDR) SDRAM, or pseudo SRAM (PSRAM).

Figure 4:
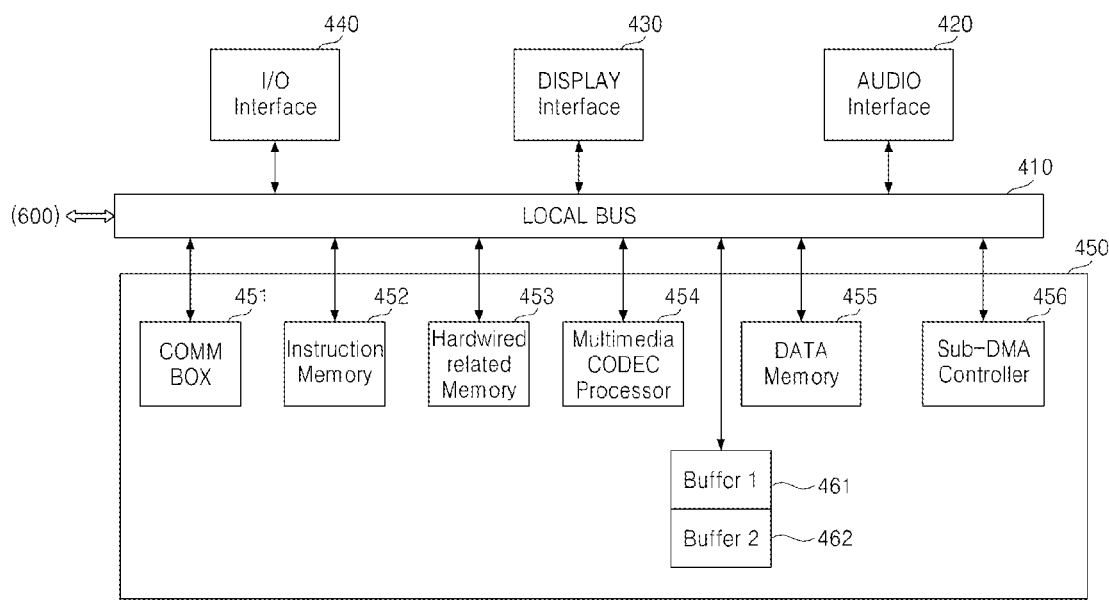
FIG. 4 is a detailed block diagram of a multimedia codec domain according to some embodiments of the inventive concepts.

FIG. 4 is a detailed block diagram of the multimedia codec domain 400 according to some embodiments of the inventive concepts. Referring to FIG. 4, the multimedia codec domain 400 includes a multimedia codec system 450 and a plurality of interface units 420, 430, and 440. The multimedia codec system 450 includes a control module, a data memory 455, a multimedia codec processor 454, and the sub-DMA controller 456.

The control module may generate an operation control instruction for the multimedia codec domain 400 according to the control of the CPU 100 and may transmit a request to the first units 21. The control module may include a communication box 451, an instruction memory 452, and a hardwired related memory 453.

The instruction memory 452 is for storing instructions that will be performed by the multimedia codec domain 400. The instructions are stored in the instruction memory 452 by CPU 100 or the top domain 200 or cached in the instruction memory 452 by the multimedia codec processor 454. The communication box 451 is a register for storing commands for the communication between the CPU 100 and the multimedia codec domain 400. A part of the register is used to control, for example, reset or interrupt the multimedia codec domain 400. The communication box 451 may analyze a control instruction received from the CPU 100 or the top domain 200 and instruct to perform an operation corresponding to the control command.

The hardwired related memory 453 stores a plurality of parameters used for the operation of the multimedia codec domain 400. For instance, when receiving an initialization command from the CPU 100, initialization parameter necessary for the initialization of the multimedia codec domain 400 among the plurality of parameters are loaded from the hardwired related memory 453.

The data memory 455 is for storing data necessary for the operation of the multimedia codec domain 400. The data memory 455 may include a plurality of buffers. The segments of target multimedia data may be stored in a first buffer 461 and a second buffer 462. Only two buffers 461 and 462 are illustrated for convenience' sake in the description, but the number of buffers may be different according to embodiments. The first buffer 461 and the second buffer 462 may be separated from the data memory 455 as an individual unit or may be included in the data memory 455. The first and second buffers 461 and 462 may be internally divided into a plurality of buffers for the efficient management of data which is input and/or output.

The first buffer 461 may store the segments of the target multimedia data received through the system memory controller 310. The first buffer 461 may temporarily store the segments of input data that has been coded by the multimedia codec processor 454. At this time, the first buffer 461 may transmit the coded segments to the stream buffer 330 through the system bus 600.

The second buffer 462 may store the segments of the target multimedia data that has been decoded. The second buffer 462 may temporarily store the segments of data input from the user interface 501 and transmit the segments to the multimedia codec processor 454.

The multimedia codec processor 454 decodes the segments stored in the first buffer 461 and transmits the decoded segments to the second buffer 462. The multimedia codec processor 454 codes the segments of input data stored in the second buffer 462 and transmits the coded segments to the first buffer 461.

The sub-DMA controller 456 may directly access the system memory 311, i.e., the stream buffer 330 and load the segments of the target multimedia data to the first buffer 461. The sub-DMA controller 456 may access the data memory 455, i.e., the first buffer 461 or the second buffer 462 and may transmit the decoded segments to the second buffer 462 or the coded segments to the first buffer 461.

A local bus 410 connects the instruction memory 452, the communication box 451, the data memory 455, and the sub-DMA controller 456 with one another independently from the system bus 600. The local bus 410 also connects the multimedia codec domain 400 with the system bus 600. The multimedia codec domain 400 also includes a plurality of interface units including an audio interface unit 420, a display interface unit 430, and an input/output (I/O) interface unit 440. The audio interface unit 420 is connected to the earphone jack 15, the speaker 3, and the microphone 14. The display interface unit 430 is connected to the display and touch screen 9. The I/O interface unit 440 is connected to the display and touch screen 9 and the USB interface 6.

The plurality of interface units may be connected to the data memory 455 and the sub-DMA controller 456 through the local bus 410 to output the decoded segments. The plurality of interface units may transmit a user's input signal to the CPU 100 or transmit input data (or raw data) to the second buffer 462 in units of segments.

The alive domain 500 includes the user interface 501 and a power management unit 502. The power management unit 502 may control power supply to the CPU 100, the top domain 200, the storage domain 300, the system bus 600, and the multimedia codec domain 400. The user interface 501 receives an input signal in various forms such as touch input, gesture input, temperature input, audio input, camera input, and button input and transmits the input signal to the IPs, i.e., the elements 100, 200, 300, and 400. The power management unit 502 may supply power to the CPU 100, the top domain 200, the system bus 600, and the multimedia codec domain 400 according to a current mode while the multimedia codec domain 400 is performing a decoding operation or while segments are being output through the interface units.

Figure 5:
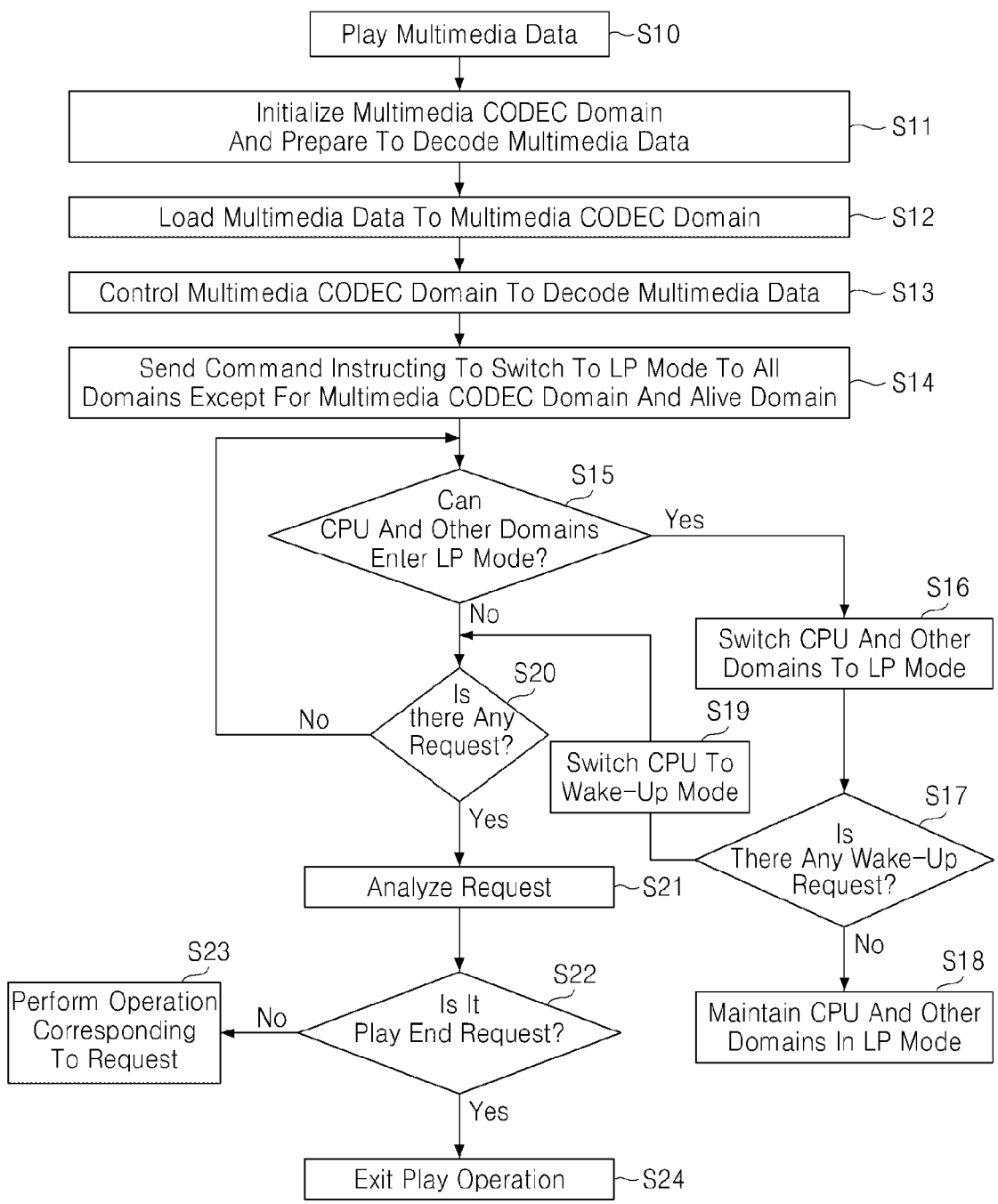
FIG. 5 is a flowchart of a method of operating a multimedia processing system according to some embodiments of the inventive concepts.

FIG. 5 is a flowchart of a method of operating the multimedia processing system 20 according to some embodiments of the inventive concepts. Target multimedia data to be played is selected from among a plurality of multimedia data stored in the storage unit 321 in response to an input signal generated by a user's choice or a control signal generated by the CPU 100 and is ready to be played in operation S10. The CPU 100 initializes the multimedia codec domain 400. The multimedia codec domain 400 executes an instruction stored in the instruction memory 452, analyzes an instruction transmitted through the communication box 451, and performs an operation corresponding to the instruction. The CPU 100 controls the top domain 200 and prepares to decode the target multimedia data by performing scheduling and setting instructions necessary for a decoding operation in operation S11. The main DMA controller 201 accesses the target multimedia data stored in the storage unit 321 through the storage controller 320. The storage controller 320 reads the target multimedia data from the storage unit 321 in units of predetermined segments at the request of the main DMA controller 201 and transmits the segments of the target multimedia data to the system memory controller 310. The system memory controller 310 writes the segments to the stream buffer 330.

When the stream buffer 330 is filled with the segments, the CPU 100, the main DMA controller 201, or the sub-DMA controller 456 loads the segments to the data memory 455 or the first buffer 461 in the multimedia codec domain 400 in operation S12.

When the first buffer 461 starts to be filled with the segments, the CPU 100 drives and controls the multimedia codec domain 400 to decode the segments in operation S13. The multimedia codec processor 454 accesses the first buffer 461 and decodes the accessed segments. The CPU 100 sends a command instructing to switch to a low-power (LP) mode to all domains except for the multimedia codec domain 400 and the alive domain 500 while the decoding operation is being performed in operation S14.

Before the CPU 100 and the other domains except for the multimedia codec domain 400 and the alive domain 500 enter the LP mode in operation S15, the CPU 100 checks whether there is any request to be processed in operation S20. When there is no request to be processed, the CPU 100 and the other domains are switched to the LP mode in operation S16 and are maintained in LP mode in operation S18 unless there is any wake-up request in operation S17. When there is any wake-up request while the CPU 100 and the other domains are in the LP mode in operation S17, the CPU 100 is switched to a wake-up mode in operation S19. The CPU 100 checks whether there is any other request in operation S20.

When there is any request in operation S20, the CPU 100 analyzes the request in operation S21. When the analyzed request is a play end request in operation S22, the multimedia processing system 20 terminates the play operation in operation S24. However, when the analyzed request is not the play end request in operation S22, the multimedia processing system 20 performs an operation corresponding to the request in operation S23. In other words, only after the CPU 100 performs the operation corresponding to the request, the other domains except for the multimedia codec domain 400 can enter the LP mode in operation S16.

Figure 6:
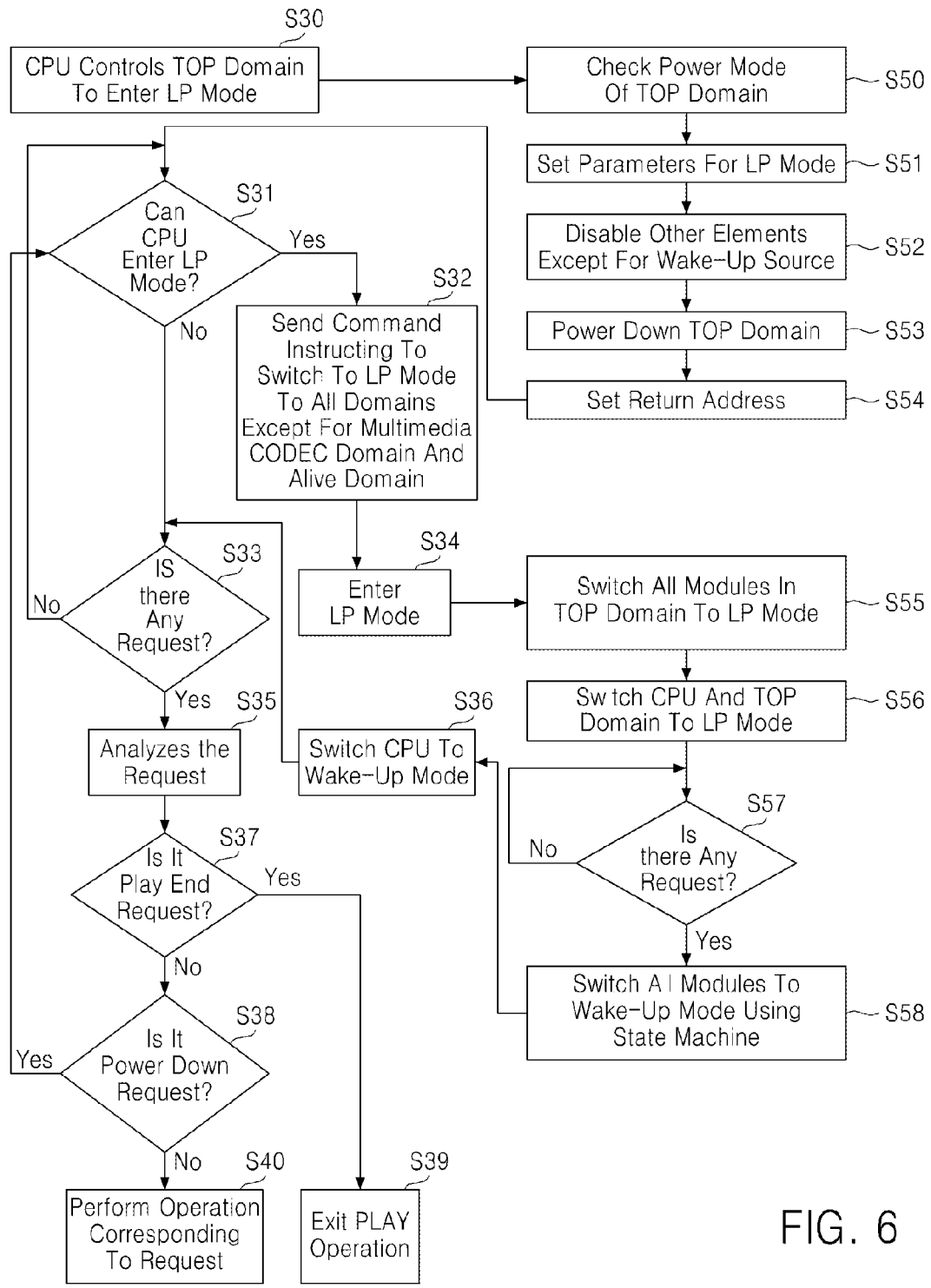
FIG. 6 is a detailed flowchart of operations of a central processing unit (CPU) and a top domain in the method illustrated in FIG. 5.

FIG. 6 is a detailed flowchart of operations of the CPU 100 and the top domain 200 in the method illustrated in FIG. 5. Referring to FIG. 6, the CPU 100 controls the top domain 200 to enter the LP mode in operation S30. In detail, the CPU 100 checks the current power mode of the top domain 200 in operation S50 and sets parameters corresponding to the LP mode in the power management unit 502 in operation S51. The power management unit 502 disables other elements except for some related with a wake-up source in operation S52. The power management unit 502 powers down the top domain 200 in operation S53. The CPU 100 stores an address at which the CPU 100 starts after wake-up in an alive register (not shown) (included in the alive domain 500) in operation S54. Whether the CPU 100 can be switched to the LP mode is checked in operation S31.

The CPU 100 sends a command instructing to switch to the LP mode to the other domains except for the multimedia codec domain 400 and the alive domain 500 in operation S32. The other domains are switched to the LP mode according to the command in operation S34.

When there is any request to be processed in operation S33, the CPU 100 analyzes the request in operation S35. When the request is the play end request in operation S37, the CPU 100 exits the play operation in operation S39. However, when the request is neither the play end request nor a power down request in operations S37 and S38, the CPU 100 performs an operation corresponding to the request in operation S40.

All modules or IPs in the top domain 200 are switched to the LP mode by the control of the power management unit 502 in operation S55. The CPU 100 and the top domain 200 are switched to the LP mode in operation S56. The power management unit 502 may switch the CPU 100 and the top domain 200 to the LP mode sequentially or at a time. Even while the CPU 100 and the top domain 200 are in the LP mode, when there is any request from outside in operation S57, all modules are switched to the wake-up mode by a state machine in operation S58. After the CPU 100 is switched from the LP mode to the wake-up mode in operation S36, the CPU 100 checks if there is any request to be processed in operation S33 and performs an operation corresponding to the request in operations S35 through S40. The power management unit 502 may switch the CPU 100 and the top domain 200 from the LP mode to the wake-up mode sequentially or at a time.

Figure 7:
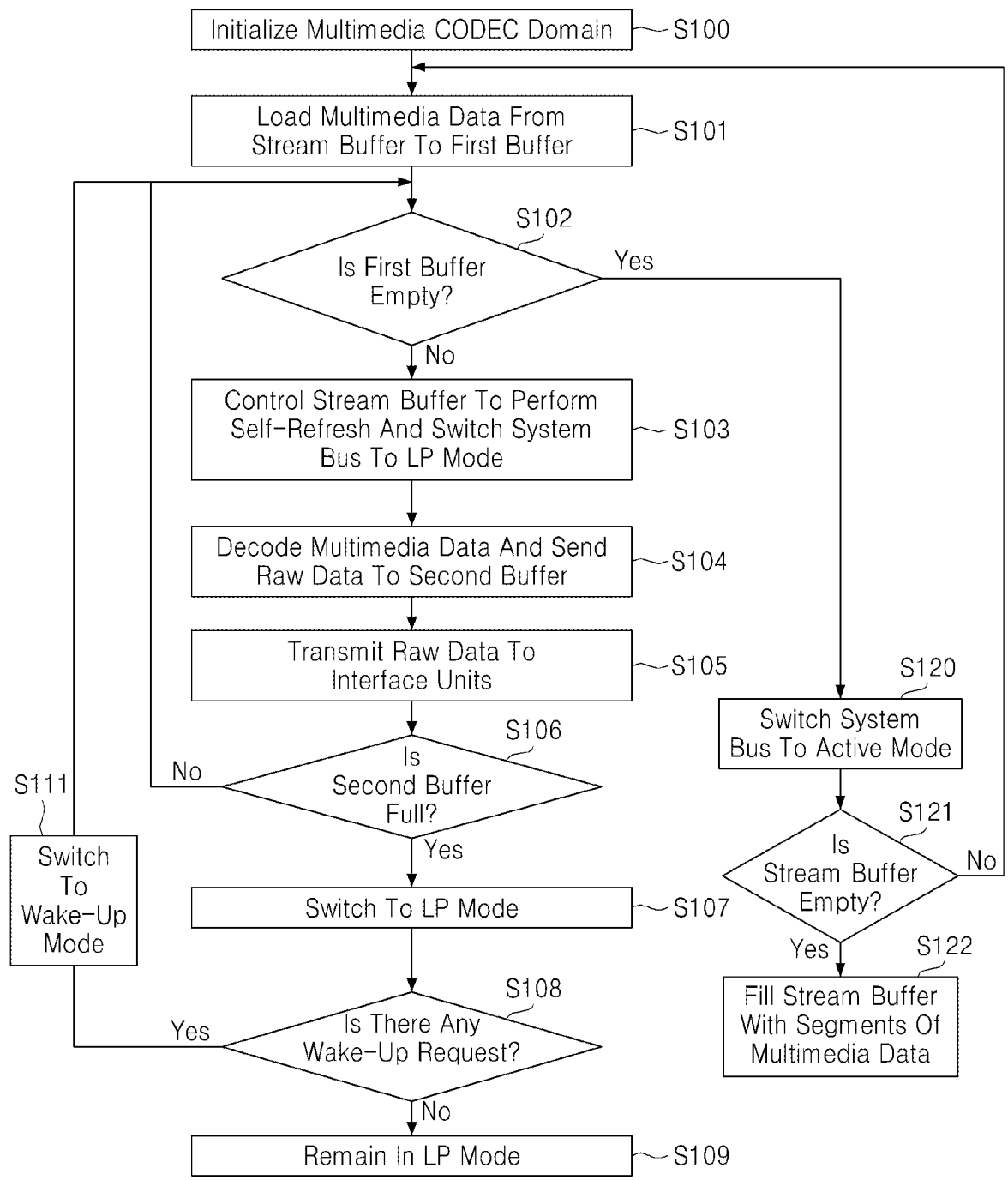
FIG. 7 is a detailed flowchart of operations of a multimedia codec domain in the method illustrated in FIG. 5.

FIG. 7 is a detailed flowchart of operations of the multimedia codec domain 400 in the method illustrated in FIG. 5. Referring to FIG. 7, the multimedia codec domain 400 is initialized according to the control of the CPU 100 in operation S100. The segments of the target multimedia data are loaded by the top domain 200 from the stream buffer 330 to the first buffer 461 in operation S101. The first buffer 461 may be implemented by a dual buffer. At this time, when one part of the first buffer 461 is empty, a request to send data segments may be sent to the sub-DMA controller 456 and the sub-DMA controller 456 may transmit the data segments from the stream buffer 330 to the part of the first buffer 461 in response to the request. At this time, a decoding operation is performed in the other part of the first buffer 461 that has already been filled with segments. The two part of the first buffer 461 may be alternately filled and emptied. Meanwhile, the multimedia codec processor 454 may directly access the storage domain 300 using the sub-DMA controller 456 and transmit the segments of the target multimedia data to the first buffer 461 up to the last one.

When the first buffer 461 is not empty in operation S102, the multimedia codec processor 454 switches the system bus 600 to the LP mode and the stream buffer 330 is controlled to perform a self-refresh for data reliability in operation S103.

The multimedia codec processor 454 decodes the segments in the first buffer 461 and sends decoded segments, i.e., raw data, to the second buffer 462 in operation S104. The sub-DMA controller 456 transmits the decoded segments to the interface units 420, 430, and 440 in operation S105. The decoded segments are output, for instance, through the audio interface 420 or through the display interface 430.

When the second buffer 462 is full in operation S106, the multimedia codec domain 400 stops the decoding operation and enters the LP mode in operation S107. The second buffer 462 may be implemented by a dual buffer. In this case, when one part of the second buffer 462 is full, the multimedia codec domain 400 stops the decoding operation. At this time, segments of audio data have already been transmitted to the other part of the second buffer 462. The two parts of the second buffer 462 may be alternately filled and emptied. Even when the multimedia codec domain 400 is in the LP mode since the decoding operation is stopped or completed, the decoded segments in the second buffer 462 may be continuously output. However, before the second buffer 462 is full in operation S106, the multimedia codec domain 400 is maintained in the active mode since the decoding operation is being performed.

After the multimedia codec domain 400 enters the LP mode in operation S107 since the stop or completion of the decoding operation, when there is any request from the interface unit 420, 430, or 440 in operation S108, the multimedia codec domain 400 is switched to the wake-up mode in operation S109. When all segments in the second buffer 462 are output emptying the second buffer 462, segments in one part of the first buffer 461 are continuously decoded in operations S102 through S106 unless the play of the target multimedia data is completed. The sub-DMA controller 456 loads the segments of the target multimedia data from the stream buffer 330 to the other part of the first buffer 461 in operation S101 until all segments of the multimedia data are emptied out of the stream buffer 330.

In detail, the multimedia codec domain 400 activates only the system bus 600 without waking up the CPU 100 and the top domain 200 in operation S120. The multimedia codec processor 454 checks whether the stream buffer 330 is empty in operation S121. When the stream buffer 330 is empty, the multimedia codec processor 454 loads the other segments of the target multimedia data from the storage unit 321 to the stream buffer 330 to fill the stream buffer 330 in operation S122. When the stream buffer 330 is not empty, the multimedia codec processor 454 loads the segments of the target multimedia data from the stream buffer 330 to the first buffer 461 in operation S101. In other words, the multimedia codec processor 454 may control the data segments to be directly loaded from the storage unit 321 to the stream buffer 330 or to the first buffer 461 through the sub-DMA controller 456.

As a result, even when there is a limit to the size of the data memory 455 or the stream buffer 330 while the multimedia codec domain 400 performs a decoding operation, the power consumption of the multimedia processing system 20 is reduced because time while the CPU 100 or the top domain 200 is powered down is elongated.

Figure 8:
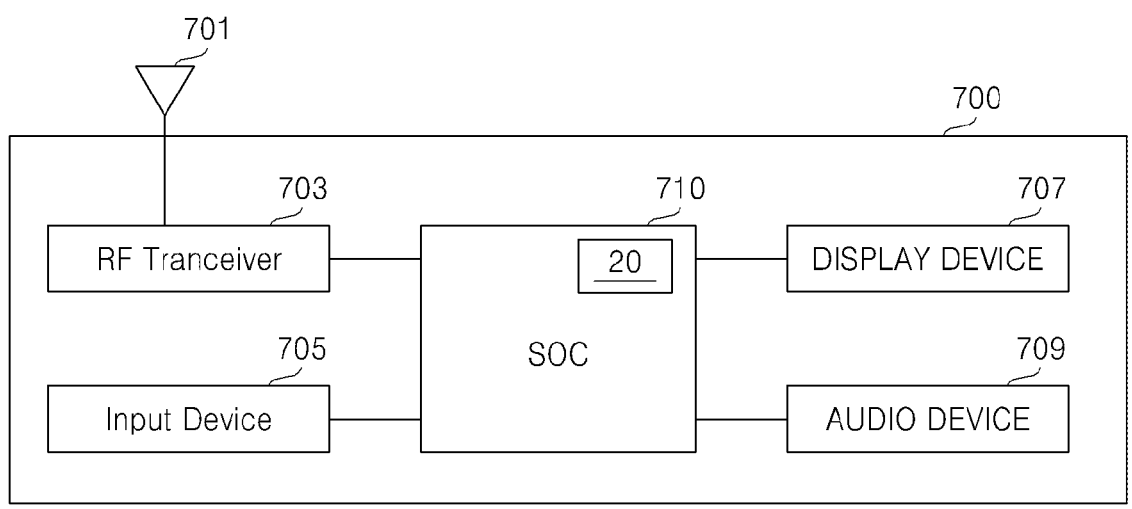
FIG. 8 is a block diagram of an electronic system including a multimedia processing system according to some embodiments of the inventive concepts.

FIG. 8 is a block diagram of an electronic system 700 including the multimedia processing system 20 according to some embodiments of the inventive concepts. Referring to FIG. 8, the electronic system 700 includes a system on chip (SOC) 710 including the multimedia processing system 20 illustrated in FIG. 2, an antenna 701, a radio frequency (RF) transceiver 703, an input device 705, a display device 707, and an audio device 709.

The multimedia processing system 20 illustrated in FIG. 2 may be implemented as the SOC 710. The SOC 710 may be manufactured in a single chip and implemented as a single package. The electronic system 700 including the SOC 710 may be implemented as a PC, a network server, a tablet PC, a net-book, an e-reader, a personal digital assistant (PDA), a portable multimedia player (PMP), an MP3 player, or a MP4 player.

The RF transceiver 703 may transmit or receive an RF signal through the antenna 701. The RF transceiver 703 may convert the RF signal received through the antenna 701 into a signal that can be processed by the SOC 710. The SOC 710 may process a signal output from the RF transceiver 703 and transmit the processed signal to the display device 707. The RF transceiver 703 may also convert a signal output from the SOC 710 into an RF signal and output the RF signal to an external device through the antenna 701.

The input device 705 allows a control signal for controlling the operation of the SOC 710 or data to be processed by the SOC 710 to be input to the electronic system 700. The input device 705 may be implemented as a pointing device such as a touch pad or a computer mouse, a keypad, a microphone, or a keyboard.

The audio device 709 is used to output signals generated by the SOC 710 decoding target multimedia data. The audio device 709 may be implemented as a speaker or an output device connected with an earphone.

As described above, according to some embodiments of the inventive concepts, a multimedia processing system individually controls the power mode of a system bus and the power mode of a multimedia codec domain during a decoding operation of multimedia data, thereby elongating the power-down time of a CPU and a top domain. As a result, the power consumption of the multimedia processing system is reduced.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A multimedia processing system comprising:
a plurality of first units including a central processing unit (CPU) and a top domain;
a storage domain configured to store a plurality of multimedia data;
a multimedia codec domain configured to decode segments of target multimedia data received from the storage domain and to output decoded segments according to control of the CPU;
a system bus configured to connect the plurality of first units, the storage domain, and the multimedia codec domain with one another; and
an alive domain configured to control power supply to the plurality of first units, the storage domain, the multimedia codec domain, and the system bus, the alive domain including a user interface configured to receive an input signal from a user,
wherein the multimedia processing system is configured such that while the multimedia codec domain is performing a decoding operation, the plurality of first units and the system bus are switched to a low-power mode.

2. The multimedia processing system of claim 1, wherein the multimedia processing system is configured such that the multimedia codec domain is switched to the low-power mode when the multimedia codec domain completes the decoding operation.

3. The multimedia processing system of claim 1, wherein the multimedia codec domain is configured such that when the plurality of first units are in the low-power mode, the multimedia codec domain activates the system bus independently from the plurality of first units to access the storage domain.

4. The multimedia processing system of claim 1, wherein the top domain comprises:
a main direct memory access (DMA) controller configured to directly access the target multimedia data stored in the storage domain and load the segments of the target multimedia data to the multimedia codec domain according to the control of the CPU based on the input signal.

5. The multimedia processing system of claim 1, wherein the storage domain comprises:
a storage unit configured to store the plurality of multimedia data;
a storage controller configured to control the storage unit and an access to the storage unit;
a system memory including a stream buffer configured to store the target multimedia data; and
a system memory controller configured to control the system memory and an access to the system memory, and
wherein the multimedia processing system is configured such that segments of the target multimedia data received at the system memory controller from the storage unit through the storage controller are loaded to the stream buffer through the system memory controller.

6. The multimedia processing system of claim 5, wherein the multimedia codec domain comprises:
a control module configured to generate an operation control command for the multimedia codec domain according based on control signals from the CPU and to send a request to the plurality of first units;
a first buffer configured to store the segments of the target multimedia data received through the system memory controller;
a second buffer configured to store the decoded segments of the target multimedia data;
a multimedia codec processor configured to decode the segments in the first buffer and send the decoded segments to the second buffer;
a sub-direct memory access (DMA) controller configured to access the stream buffer or the first buffer; and
a local bus configured to connect the control module, the first buffer, the second buffer, the multimedia codec processor, the sub-DMA controller, and the system bus with one another.

7. The multimedia processing system of claim 6, wherein the control module is configured such that when the stream buffer is empty, the control module switches the plurality of first units and the system bus to a wake-up mode and generates a request to transfer other segments of the target multimedia data from the storage unit.

8. The multimedia processing system of claim 1, wherein the CPU is configured to initialize the multimedia codec domain, control the multimedia codec domain to perform the decoding operation when the input signal is a play start request, and control the multimedia codec domain to exit the decoding operation when a request of the multimedia codec domain or the input signal is a play end request.

9. The multimedia processing system of claim 6, wherein the control module is configured to send a request to exit the decoding operation to the CPU when one of the segments in the first buffer is a last segment of the target multimedia data or when the input signal is a play end request.

10. The multimedia processing system of claim 6, wherein at least one of the first buffer and the second buffer operates as a dual buffer.

11. A method of operating a multimedia processing system including a multimedia codec domain, a central processing unit (CPU), a top domain, a storage domain, and a system bus, the method comprising:
receiving, at the CPU, an input signal corresponding to a play start request for target multimedia data;
accessing, at the top domain, the storage domain;

transmitting, from the top domain, segments of the target multimedia data to the multimedia codec domain in response to control signals from the CPU;

decoding, at the multimedia codec domain, the segments and outputting decoded segments; and repeating the receiving, accessing and decoding operations until the multimedia codec domain decodes a last segment of the target multimedia data or a play end request is received, wherein the CPU, the top domain, and the system bus are switched to a low-power mode while the multimedia codec domain is decoding the segments.

12. The method of claim 11, wherein the accessing comprises:

activating only the system bus; and directly accessing the storage domain while the multimedia codec domain is decoding the segments.

13. The method of claim 11, further comprising:

switching the multimedia codec domain to the low-power mode when decoding of the last segment of the target multimedia data is completed or when the multimedia processing system receives a play end request.

14. The method of claim 11, wherein the multimedia codec domain includes a first buffer configured to store the segments of the target multimedia data received from the storage domain, and a second buffer configured to store and output the decoded segments, and wherein the accessing comprises:

activating the system bus;

directly accessing other segments of the target multimedia data in the storage domain when the first buffer empties;

transmitting the other segments to the first buffer; and switching the system bus to the low-power mode.

15. The method of claim 11, further comprising:

initializing, at the top domain, the multimedia codec domain according to the control of the CPU.

16. A multimedia processing system comprising:

a central processing unit (CPU);

a storage domain configured to store multimedia data;

a multimedia codec domain configured to decode segments of the multimedia data received from the storage domain and to output decoded segments in response to control signals from the CPU;

a system bus configured to connect the CPU, the storage domain, and the multimedia codec domain with one another; and wherein the multimedia processing system is configured such that when the multimedia codec domain performs a decoding operation, the multimedia processing system switches the CPU and the system bus from a first power mode to a second power mode lower than the first power mode, and when the multimedia codec domain accesses the multimedia data stored in the storage domain during the decoding operation, the multimedia processing system switches the system bus from the second power mode to a power mode higher than the second power mode without waking up the CPU, and the multimedia codec domain is configured to access the multimedia data stored in the storage domain via the system bus.

17. The multimedia processing system of claim 16, further comprising:

a plurality of first units, the CPU being a first one the plurality of first units, a top domain being a second one of the plurality of first units, the system bus being configured to connect the plurality of first units, the storage domain, and the multimedia codec domain with one another.

18. The multimedia processing system of claim 17, further comprising:

an alive domain including a user interface configured to receive an input signal from a user, the alive domain configured to control power supply to the plurality of first units, the storage domain, the multimedia codec domain, and the system bus.

* * * * *

UNITED STATES PATENT AND TRADEMARK OFFICE
CERTIFICATE OF CORRECTION

PATENT NO. : 9,104,414 B2
APPLICATION NO. : 13/962372
DATED : August 11, 2015
INVENTOR(S) : Sun Kyu Kim et al.

Page 1 of 1

It is certified that error appears in the above-identified patent and that said Letters Patent is hereby corrected as shown below:

Claims

Column 14, lines 20-39 (Claim 6): should read as follows:

6. The multimedia processing system of claim 5, wherein the multimedia codec domain comprises:

a control module configured to generate an operation control command for the multimedia codec domain based on control signals from the CPU and to send a request to the plurality of first units;

a first buffer configured to store the segments of the target multimedia data received through the system memory controller;

a second buffer configured to store the decoded segments of the target multimedia data;

a multimedia codec processor configured to decode the segments in the first buffer and send the decoded segments to the second buffer;

a sub-direct memory access (DMA) controller configured to access the stream buffer or the first buffer; and a local bus configured to connect the control module, the first buffer, the second buffer, the multimedia codec processor, the sub-DMA controller, and the system bus with one another.

Signed and Sealed this
Fifth Day of April, 2016

Michelle K. Lee
*Director of the United States Patent and Trademark Office*